United States Patent [19]

Lewis et al.

[11] Patent Number: 5,619,544
[45] Date of Patent: Apr. 8, 1997

[54] UNIVERSAL ASYNCHRONOUS RECEIVE/TRANSMIT CIRCUIT WITH FLOW CONTROL

[75] Inventors: Clarence D. Lewis, Richardson; Mahmoud M. Yazdani, Allen; Dinghui Nie, Dallas,; Brian T. Deng, Richardson, all of Tex.; Matthew J. DiMarco, Chicago, Ill.

[73] Assignee: Texas Instruments Incorporated, Dallas, Tex.

[21] Appl. No.: 607,840

[22] Filed: Feb. 27, 1996

Related U.S. Application Data

[63] Continuation of Ser. No. 253,882, Jun. 3, 1994, abandoned.
[51] Int. Cl.$^6$ ................ H04B 1/38; H04L 7/00
[52] U.S. Cl. ............ 375/377; 375/259; 375/219; 375/354; 395/250; 395/200.13; 395/286; 364/939; 364/940; 364/270.5
[58] Field of Search ............ 375/377, 259, 375/219, 354, 220; 395/200.1, 200.07, 200.13, 200.17, 250; 364/239, 239.1, 239.2, 239.6, 239.7, 239.8, 242.3, 242.31, 284.1, 284.2, 229.1, 939, 940, 270.5, 270.6

[56] References Cited

U.S. PATENT DOCUMENTS

| | | | |
|---|---|---|---|
| 5,179,706 | 1/1993 | Swanson et al. | 395/293 |
| 5,218,683 | 6/1993 | Jerrim et al. | 395/285 |
| 5,301,275 | 5/1994 | Vanbuskirk et al. | 395/250 |
| 5,365,552 | 11/1994 | Astle. | |

*Primary Examiner*—Wellington Chin
*Assistant Examiner*—William Luther
*Attorney, Agent, or Firm*—Warren L. Franz; Wade James Brady, III; Richard L. Donaldson

[57] ABSTRACT

A method and apparatus for a circuit physically realizing a Universal Asynchronous Receive/Transmit (UART) circuit 31, 40 having an automatic flow control feature. A preferred embodiment includes a UART 31 provided with additional control circuitry 39, 34 for automatically pausing transfers from the transmit data circuitry 35, 32 in response to a transition at the CTS (Clear to Send) input, and further provided with control circuitry 39 for automatically asserting and deasserting a RTS (Ready to Send) output when a receiver data threshold is reached.

23 Claims, 8 Drawing Sheets

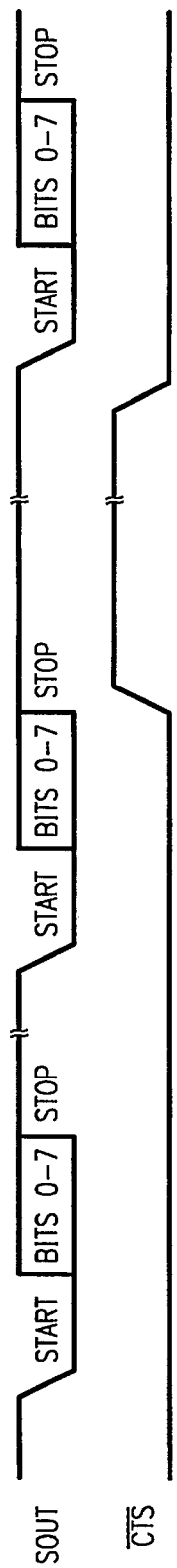
FIG. 6
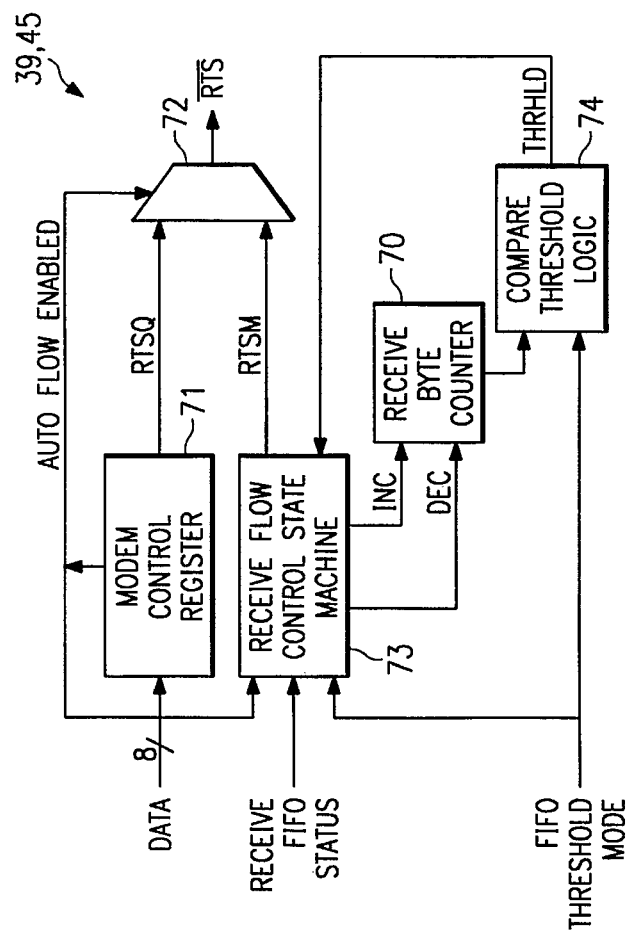
FIG. 7
FIG. 8

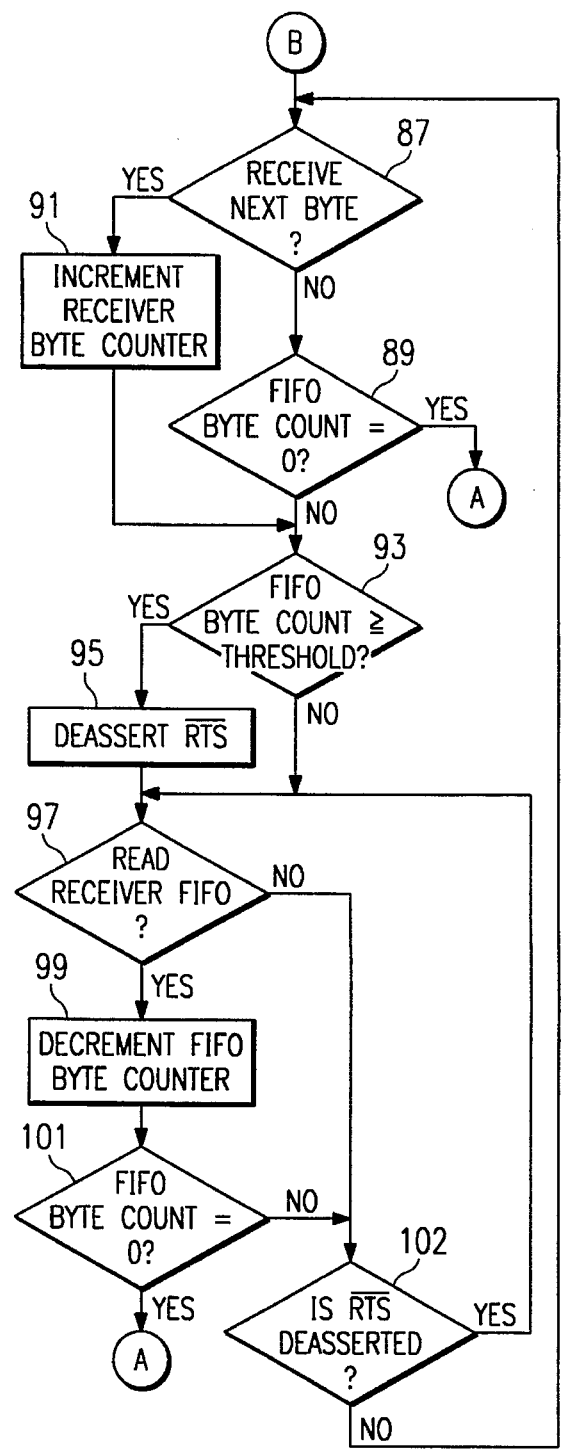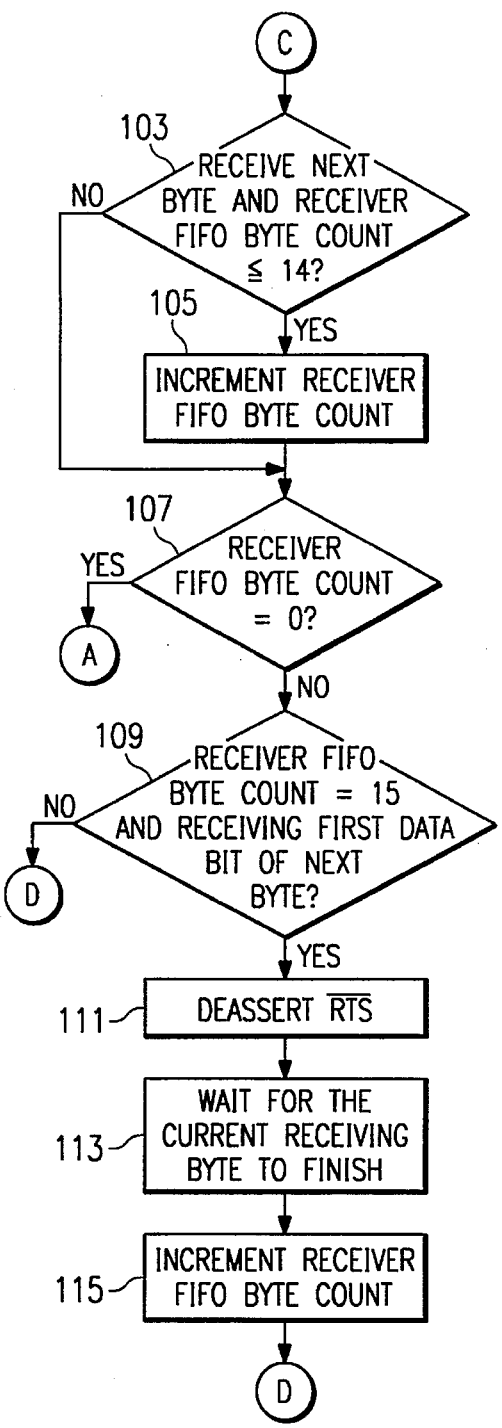
FIG. 11
FIG. 12

UNIVERSAL ASYNCHRONOUS RECEIVE/TRANSMIT CIRCUIT WITH FLOW CONTROL

This application is a Continuation, of application Ser. No. 08/253,882, filed Jun. 3, 1994, now abandoned.

FIELD OF THE INVENTION

This invention generally relates to a method and apparatus for an improved Universal Asynchronous Receive/Transmit (hereinafter UART) circuit for asynchronous data transfers, as are typically used between processors, microprocessors and other circuitry where data is transferred using asynchronous serial media.

BACKGROUND OF THE INVENTION

Without limiting the scope of the invention, the background is described in connection with known UART devices, an example of which is the TL16C550 integrated circuit available from Texas Instruments. Many other known UART devices are commonly commercially available.

In transferring data between UART devices, typically each UART is coupled to a modem circuit, and each UART is controlled by a local processor or microprocessor. The UART is an asynchronous transmit and receive device that is used to couple a local data bus to a remote data bus via an asynchronous serial interface. The UART has a parallel data port and control lines for coupling to the local processor, which transfers data to and from the UART on a parallel data bus. Each UART is controlled by the associated local processor through the reading and writing of addressable register locations within the UART. Each UART has an asynchronous serial data port which is typically coupled to a modem. In operation, the UART handshakes data transfers from storage registers within the UART and across the asynchronous interface by using control lines and status inputs coupled to the modem. The data is converted to serial form and shipped across the asynchronous interface in serial form. The modems are linked via a telephone line or local cabling.

FIG. 1 depicts a pair of typical known UART devices coupled for data transfers. For clarity, no modem devices are shown, however the UART circuits include additional output control signals to permit coupling and control through modem devices. In FIG. 1, UART comprises a receive data FIFO 131, a transmit data FIFO 133, a modem status register 139, a parallel-in/serial-out register 141, a serial-in/parallel-out register 135, and a modem control register 137. Interface bus 143 permits a processor, not shown in the figure, to control and communicate with UART 1 through reading and writing operations to addressable bits and registers using the DATA, $\overline{RD}$, $\overline{WR}$ and $\overline{CS}$ lines conventionally. When the UART requires attention from the processor coupled to bus 143, it will assert the interrupt output, labeled INT.

The asynchronous interface signals of UART 1 are SIN, $\overline{RTS}$, $\overline{CTS}$, $\overline{DTR}$, $\overline{DCD}$, $\overline{RI}$, $\overline{DSR}$ and SOUT in FIG. 1. The SIN signal is the serial data input from the other device, here UART 3. The SOUT signal is the serial data output signal from UART 1 and is coupled to the SIN signal of UART 3. The remaining signals can be connected in a variety of ways. The actual connection is dictated by the application and the software and hardware used in the application.

In FIG. 1, $\overline{RTS}$ (Request to Send) is an output signal that indicates a device is ready to receive data. $\overline{CTS}$ (Clear to Send) is an input signal that is checked to see if a remote device is ready for data. $\overline{DTR}$ (Data Terminal Ready) is an output that indicates to an external device the UART is ready to establish communication.

Typical input signals are also shown in FIG. 1. $\overline{DCD}$ (Data Carrier Detect) is an input which feeds a bit in the modem status register of the UART devices. $\overline{RI}$ (Ring Indicator) is another input that feeds a bit in the modem status register. $\overline{DSR}$ (Data Set Ready) is an input which feeds another bit in the modem status register. These inputs can be enabled to generate an interrupt on the INT output to alert the processor coupled to the processor interface that the UART requires attention. These are hooked up as best suits the software and hardware used in a particular application environment.

UART 3 in FIG. 1 is the same as UART 1, and comprises equivalent elements: a receive data FIFO 331, a transmit data FIFO 333, a modem status register 339, a parallel-in/serial-out register 341, a serial-in/parallel-out register 335, and a modem control register 337. Interface bus 343 allows a second processor to control UART 3 by reading and writing addressable bits and registers in UART 3, again using the $\overline{CS}$, $\overline{WR}$, $\overline{RD}$ and DATA lines conventionally.

For clarification, a simple data transfer between UART 1 and UART 3 in FIG. 1 is described. Assume a transfer from a device or processor coupled to UART 1 to a device or processor coupled to UART 3 begins. Since UART 1 is the transmitting UART, a processor coupled to interface bus 143 must first write data words for transmission to the transmit data FIFO 133 of UART 1. Typically software routines running in the transmitting processor check the status of the interface by reading the modem status register 139 using the $\overline{RD}$, $\overline{CS}$ and DATA lines before the transfer begins. The software evaluates the various bits in the modem status register to see if a new transfer is possible. If the status register 139 indicates the remote UART 3 is ready to receive data, the data to be transferred is written to the transmit data FIFO 133. When the transmitting device writes a word to the transmit data FIFO 133 of UART 1, the transmission will begin, and the first word will be output in serial fashion on the SOUT line of UART 1. The data words are then each transmitted by retrieving them from the transmit data FIFO 133 and placing each word into the parallel-in/serial-out register 141. The register 141 then shifts and transmits the bits serially on the SOUT output of UART 1.

The data transmitted from the SOUT output of UART 1 is received at the SIN input of UART 3. UART 3 will then shift the serial bits into its serial-in/parallel-out register 335 and as each word is completely shifted in, the words are placed in parallel fashion into locations in the receive data FIFO 331 of UART 3. If UART 3 fills its receive data FIFO 331 with data words which are shifted in through the SIN input of UART 3 and into the serial-input/parallel-output register 335, UART 3 will assert an interrupt on the INT output. However, the transmission of data will continue until the transmit data FIFO of the UART 1 is empty, i.e., no interruption in the transmit routine occurs even though the receiving UART 3 may be overwriting data into the receive data FIFO of UART 3. The prior art UART's require that the processors handle all synchronization for the transfer. Also, if the transmission of data continues after the receive data FIFO 331 has filled in the receiving UART, the receiving UART 3 will set an overrun error bit in its modem status register 339.

The user may configure the receiving FIFO with a threshold level that is lower than the size of the FIFO. In the prior art, the receiver may have a threshold of four, for example. By using a threshold level smaller than the available FIFO, it may be possible to avoid an overrun error if the processor coupled to the receiving UART can service an interrupt and read the receive data FIFO before the transmit data FIFO fills it. By setting the trigger level low, the interrupt to the processor occurs earlier and a modem status input to the transmitting UART 1 will be deasserted earlier. However, because the transmitting UART does not respond to the deassertion of a modem status input until the transmit data FIFO is completely empty, the overrun error may still occur with a low threshold.

Although the retransmit data method of overrun error correction was acceptable to the systems of the prior art, as processor throughput rates increase, and data word widths increase there is a need for a UART that will transfer data as efficiently as possible, without the necessity to retransmit large blocks of words to correct an overrun error, and for this to occur with a minimum amount of processor intervention.

SUMMARY OF THE INVENTION

Generally, and in one form of the invention, an improved Universal Asynchronous Receive/Transmit (UART) circuit is described which implements an auto flow control mode of operation. In a preferred embodiment, circuitry is provided in a UART incorporating the invention that will detect when an auto flow mode is enabled, and which provides circuitry to automatically control the data flow of the transmit and receive circuitry of the UART. The preferred embodiment UART circuits eliminate data overrun errors during data transfers and reduce the need for processor intervention and retransmit cycles to cure the errors, thus improving system performance over prior art systems.

BRIEF DESCRIPTION OF THE DRAWINGS

In the drawings:

FIG. I depicts the block diagrams of two prior art UART circuits coupled for communication;

FIG. 6 depicts a waveform timing diagram of the operation of the transmit flow control circuitry of the invention;

FIG. 7 depicts a block diagram of the receive flow control circuit of the invention;

FIG. 8 depicts a block diagram of the modem control register of FIG. 6;

FIGS. 9–13 depict a state transition diagram of the receiver flow control state machine of FIG. 7;

DETAILED DESCRIPTION OF PREFERRED EMBODIMENTS

A first preferred embodiment UART enhances the efficiency of data transfers between remote systems over asynchronous interfaces, such as EIA-232 and modem interfaces, or local telephone cabling interfaces. The preferred embodiment UART is pin compatible with the prior art UART devices it replaces, and when configured to do so can operate in the same manner as a prior art UART, so that upward compatibility with existing systems and software is assured.

The preferred embodiment UART has an additional mode of operation, the auto flow control mode. Within the UART, a transmit data FIFO and a transmit FIFO flow control state machine are used to move data from the parallel-in/serial-out register to the serial output SOUT. When the auto flow control mode is enabled, the transmit state machine samples the $\overline{CTS}$ input at the end of each data word or byte transmission. If the $\overline{CTS}$ input signal indicates that the receiver cannot accept any more words, the transmit FIFO state machine of the transmitting UART waits, polling the $\overline{CTS}$ input. Once the $\overline{CTS}$ input again indicates that the remote receiver UART is ready to receive more data, the transmit FIFO state machine again begins sending the remaining words in the transmit data FIFO. This occurs without intervention by the transmitting processor. The operation of the invention is transparent to the local processor except that fewer service interrupts will occur, thus freeing the processor for other tasks.

Figure 2:
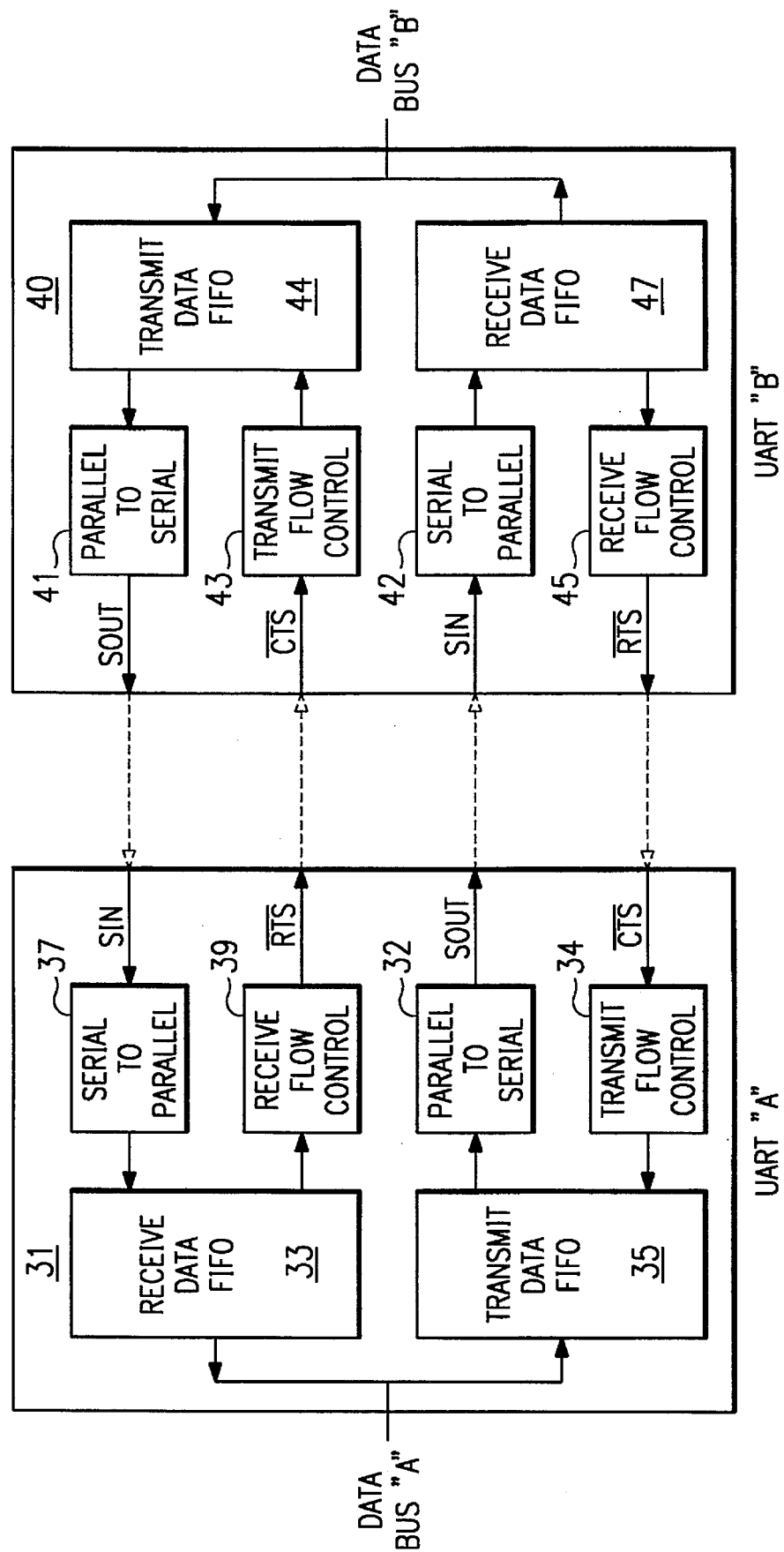
FIG. 2 depicts the block diagrams of two UART circuits incorporating the preferred embodiment and coupled for communication.

FIG. 2 depicts a pair of preferred embodiment UART circuits incorporating the auto flow control circuitry. UART A circuit 31 comprises a receive data FIFO 33, a transmit data FIFO 35, a serial-in/parallel-out register 37, a serial-in/parallel-out register 32, a receive flow control circuit 39 coupled to the $\overline{RTS}$ output, a transmit flow control circuit 34 coupled to the $\overline{CTS}$ input, and a data port data Bus A. UART "A", enumerated 31, is coupled to UART "B", enumerated 40 UART "B" is the same as UART "A", having the same circuitry coupled to its inputs and outputs in the same manner as UART "A". UART 40 comprises a receive data FIFO 47, a transmit data FIFO 44, a serial-in/parallel-out register 42, a receive flow control circuit 45 coupled to the $\overline{RTS}$ output, a transmit flow control circuit 43 coupled to the $\overline{CTS}$ input, a parallel-in/serial-out register 41, and a data port, data Bus "B".

The UART devices 31, 40 of FIG. 2 are coupled together in an example interconnection scheme. Other interconnection methods are possible; however the basic operation of the preferred embodiment will be as described herein.

Figure 1:
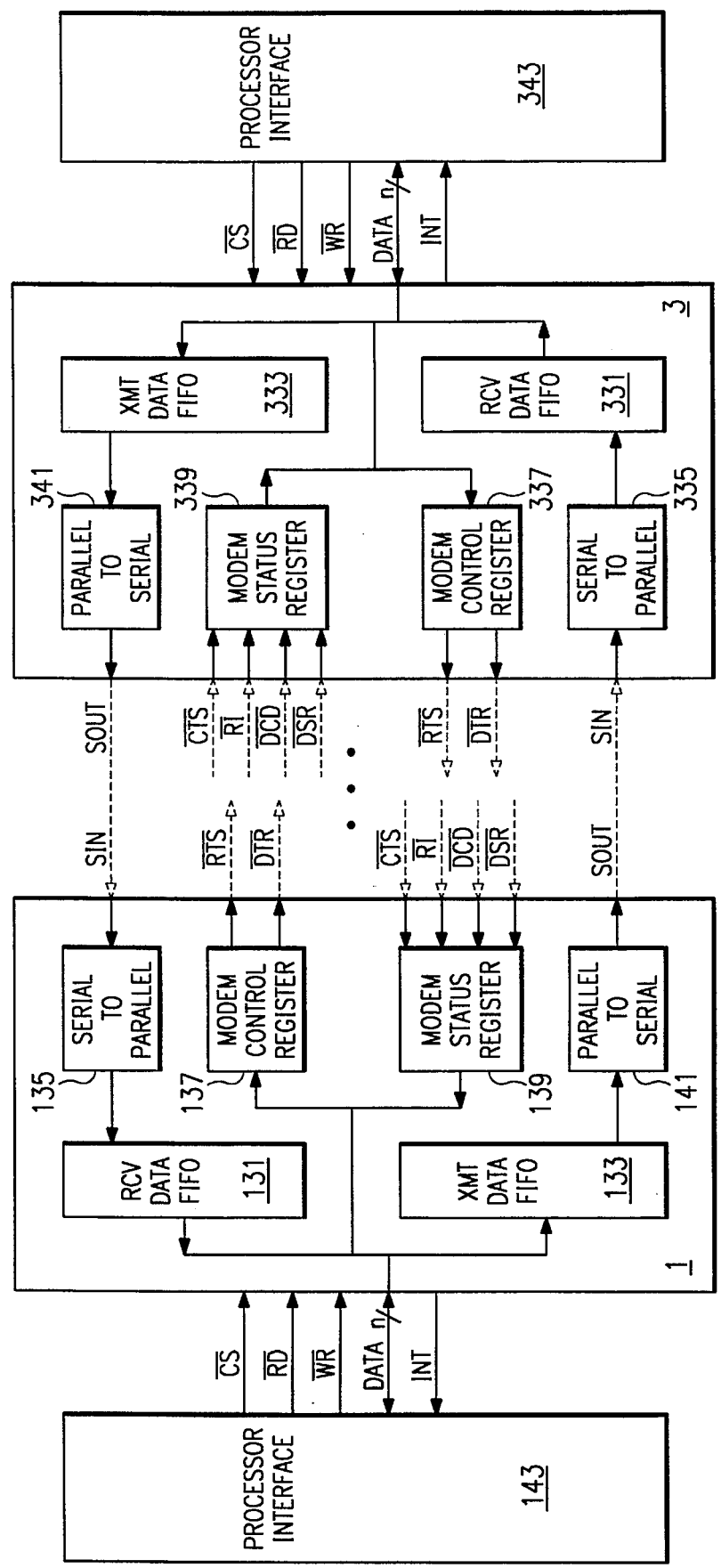

The same example used above to describe the operation of the prior art UART devices of FIG. 1 is now repeated with respect to UART devices 31 and 40 of FIG. 2, to clarify the operation of the invention. Suppose UART 31 has several words stored in its transmit data FIFO 35 for transmission. Transmit flow control circuitry 34 of UART 31 will respond to the receipt of data into the transmit data FIFO 35 by beginning a transmit data sequence. If the circuitry has been enabled, the transmit flow control circuitry 34 will operate in an automatic flow control mode. In the automatic flow control mode, the transmit flow control circuitry 34 will first check the $\overline{CTS}$ input signal to see if the receiving device, here UART 40, is ready to receive data. Assuming that the signal is asserted, (that is, it is at a low level since it is an active low signal in this embodiment), the transmit flow control circuitry 34 of UART 31 will begin transmitting the data from the transmit data FIFO 35. This is done by moving the first word or byte to the parallel-in/serial-out register 32, and then shifting the bits out one at a time onto the SOUT signal of UART 31. UART 40 then receives the bits one at a time from its SIN signal into the serial-in/parallel-out register 42 of UART 40. After an entire word or byte is completely received, the receive flow control circuitry 45 of UART 40 will cause the word to be loaded into the receive data FIFO 47. Note that if the automatic flow control mode is not enabled by the user, the UART 31 or 40 will operate exactly in the same manner as the known UART circuits, to provide continuing support for existing systems and software.

At the completion of the first word transfer, the transmit flow control circuitry 34 of UART 31 will again check to see the level of the $\overline{CTS}$ input signal before beginning the next word transfer. This is an improvement over the known UART devices, because in the known UART devices the state of the $\overline{CTS}$ input has no effect whatever on the data transmission. Using the auto flow control feature means, the transmitting UART automatically checks to see if there has been a deassertion of the $\overline{CTS}$ input between words. If the $\overline{CTS}$ input has been deasserted by the receiving device, the transmit flow control circuitry 34 will wait until the $\overline{CTS}$ input is again asserted before resuming the transfer.

The receive flow control circuitry 39 and 45 of the preferred embodiment UART's is also improved over the prior art. In this example, the receive flow control circuitry 45 will check against the receive data FIFO threshold setting after receiving each word. For the preferred embodiment, when operating in auto flow control mode, the receive flow control circuitry may be configured with one of four selectable receive data FIFO 33, or 47, threshold levels: one, four, eight or 14. If the threshold is 1, the $\overline{RTS}$ output is deasserted after each word is received, and the receive flow control circuitry 45 will wait until the received word is read by the processor coupled to the receiving UART 40 before reasserting the $\overline{RTS}$ output to UART 31 to enable further data transmission. The receiving UART 40 also asserts an interrupt to the local processor when the one word is received, indicating service is required.

If the receiver data FIFO 47 threshold is set at either four or eight, the receive flow control circuitry 45 will continue to place the received words into the FIFO 47 without deasserting the $\overline{RTS}$ output or interrupting the processor for service until the selected threshold is reached. Once the threshold is reached, the $\overline{RTS}$ output is deasserted, an interrupt is generated to the processor, and the $\overline{RTS}$ output of UART 40 will not be reasserted until all of the words in the receive data FIFO 47 are read by the receiving processor via data bus "B".

If the receive data FIFO 47 threshold is set at level 14, the fourth possible choice, the operation is somewhat different. With a setting of 14, the receive flow control circuitry 45 will continue to place the received words into the receive data FIFO 47 until the threshold is reached. Once the threshold is reached, the interrupt is again generated. After 15 words are received, the $\overline{RTS}$ output will be deasserted on receipt of the first bit of the 16th word. The receive flow control circuitry 45 will then await a single word read from the processor coupled to data bus "B". Once there is at least one word space available in the receive data FIFO 47, the $\overline{RTS}$ output is again asserted. Note that when the receive data FIFO threshold is set at 14, the auto flow control receiver circuitry will work best with a transmitting UART that also has auto flow control, because the transmitting UART must pause each time the receive data FIFO fills up. In contrast, a transmitting UART of the prior art will operate best with receive data FIFO thresholds of one, four or eight. If two preferred embodiment UART devices are used in the manner described above, no data overrun errors will occur, because the automatic flow control of the transmitter and the receiver will prevent them.

Figure 3:
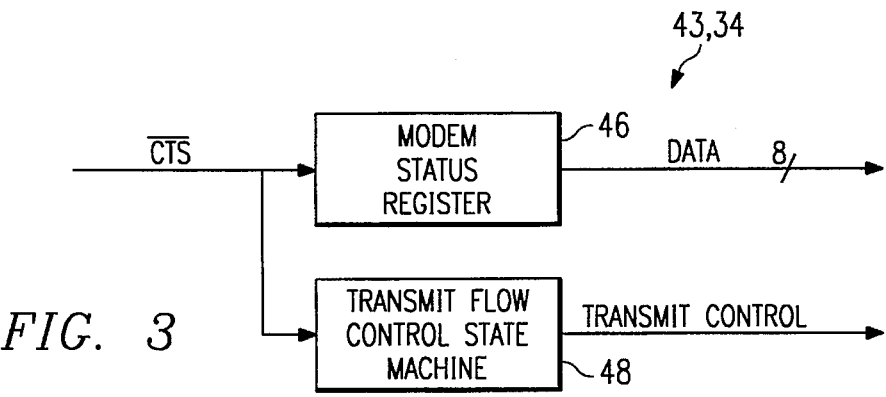
FIG. 3 depicts a block diagram of the transmit flow control circuit of the invention.

FIG. 3 depicts a block diagram of the transmit flow control circuitry 43 or 34 which is used in both UART's, 31 and 40, of FIG. 2. Transmit flow control circuitry 43 or 34 of FIG. 3 consists of two distinct circuits, the modem status register 46 and a transmit flow control state machine 48. In operation, state machine 48 is used to provide the control of the transfer of data from transmit data FIFO 35 or 44 to parallel-in/serial-out register 32 or 41 and output to the corresponding serial output signal, SOUT. Note the data output line of the modem status register 46. This is used to allow the local processor to read the bits of the modem status register, either independently or in response to an interrupt from the UART.

Figure 4:
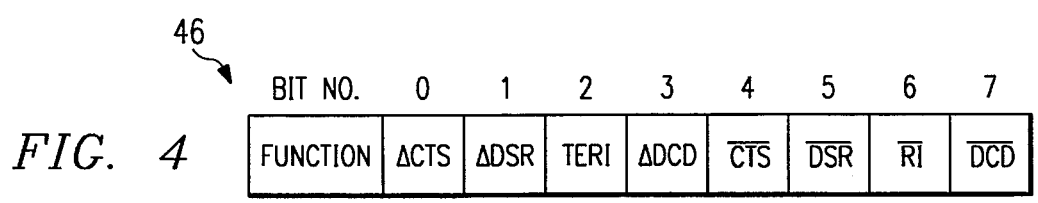
FIG. 4 depicts a block diagram of the modem status register of FIG. 3.

FIG. 4 depicts the eight bits of the modem status register 46. Bit number 0 is the ΔCTS bit. When high, this bit indicates that the level of the $\overline{CTS}$ input has changed since the last time the modem status register was read. Bits 1, 2, 3 and 5, 6, 7 are unchanged from the prior art design and relate to the control of a modem coupled to the UART, but are not relevant to the auto flow control mode or operations described here. Bit 4 indicates the level of the $\overline{CTS}$ input at the instant the register is read, and is directly coupled to the $\overline{CTS}$ input of the UART. When read, this bit indicates the current state of the $\overline{CTS}$ input.

Figure 5:
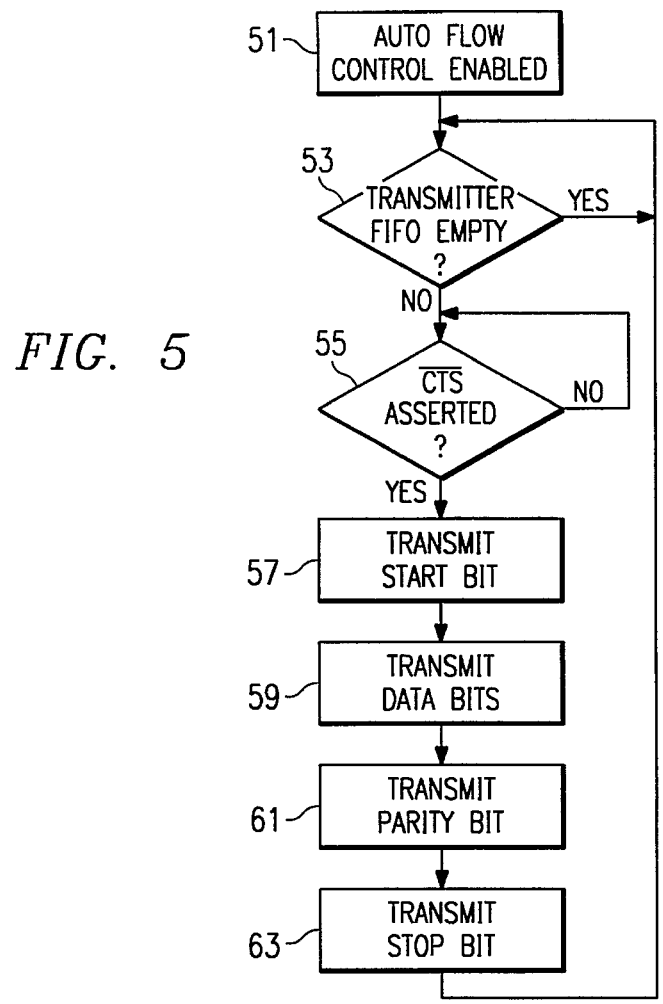
FIG. 5 depicts a state transition diagram of the transmit flow control state machine of FIG. 3.

FIG. 5 depicts the state transitions of the transmit flow control state machine 48. In state 51, the "auto flow control enabled" state, the state controller determines that the user has set the auto flow control enable bit in the modem control register, described below, and that the UART is to operate in auto flow control mode for transmission of data.

In state 53, the "transmitter FIFO empty" state, the state machine tests the status flags of the transmit data FIFO to determine if there is one or more words ready to transmit. If there is not, the state machine will remain in this state until the transmitting processor writes a word to the transmit data FIFO for transmission.

If a word is ready for transmission, the transmit flow control state machine transitions to state 55, the "CTS asserted ?" state. The state machine will not begin the transfer of the next word on the serial output signal until the receiving device indicates it is ready to receive data by asserting the $\overline{CTS}$ (clear to send) input to the transmit flow control circuitry 43, 34. Until the $\overline{CTS}$ input is asserted, the transmit data flow control state machine 48 will remain in state 55, polling the $\overline{CTS}$ input.

Once the state machine detects that the $\overline{CTS}$ input is asserted, the state machine transitions to state 57, the "transmit start bit" state. In this state, a serial start bit sequence is transferred out on the SOUT output to indicate the beginning of a new serial word. Once the start bit is transmitted, the state machine transitions to state 59, the "transmit data bits" state. In state 59, the data is transmitted on the SOUT line one bit at a time until the entire data word is transmitted. At the end of the data word transmission, the transmit data state machine transitions to the "transmit parity bit" state, 61 in FIG. 5, where the transmitting UART will serially send a parity bit out on the SOUT line. In state 63, the transmitting UART will send a stop bit on the SOUT line, indicating the current word is complete.

At the completion of the transmission of the stop bit, the transmit state machine transitions back to state 53, to again test the status flags of the transmit data FIFO. If more words are ready to transmit, the machine again transitions to the "CTS asserted?" state, state 55. In state 55 the machine will sample the current level of the $\overline{\text{CTS}}$ input and wait until the receiver indicates it is ready to receive more words. In the auto flow control mode, the transmitting UART will check the status of the $\overline{\text{CTS}}$ input at the end of each word, and will pause the transfer on a word boundary until the receiver indicates it is ready to receive more data. This action differs from the prior art circuits, which continue to send data until the transmit FIFO is completely empty. Note that if the $\overline{\text{CTS}}$ input changes during a word transfer, the remaining bits of the current word are sent before the transfer is paused. Thus the receiver UART may receive one more word after releasing the $\overline{\text{CTS}}$ input to the transmitting UART before the pause in transmission occurs, depending on where in the cycle the transmit flow control state machine is when the $\overline{\text{CTS}}$ input changes.

FIG. 6 depicts a waveform timing diagram which illustrates the operation of the transmit flow control state machine circuitry 48. Signal SOUT is shown being used to transfer an eight-bit word serially and showing the start and stop bits. The signal $\overline{\text{CTS}}$ input is the Clear to Send input to the transmit state machine 48 depicted in FIG. 3.

In operation, when the $\overline{\text{CTS}}$ input to the transmit state machine is asserted, the transmission of each word continues without interruption. As shown in FIG. 6, if the $\overline{\text{CTS}}$ input is deasserted before the middle of the current byte's stop bit, the current word will be the last one sent before the next time the $\overline{\text{CTS}}$ input is lowered. If the $\overline{\text{CTS}}$ input changes after the middle of the current stop bit is output on signal SOUT, the next word will be sent and then the transmit state machine will stop sending data until the $\overline{\text{CTS}}$ input is again asserted.

FIG. 7 depicts the receive flow control circuitry 39 and 45 which is used in the UART circuits in FIG. 2. The receive flow control circuitry 39 comprises the modem control register 71, the $\overline{\text{RTS}}$ output multiplexer 72 and the receive flow control state machine 73, the receive byte counter 70 and the compare threshold logic 74. The modem control register is addressable by the user over the data bus input DATA, and the user may set various mode bits to configure the UART and enable different modes of operation. When the auto flow control mode of the invention is enabled, the bit of the modem control register 71 that controls this feature is coupled to the $\overline{\text{RTS}}$ output multiplexer control line and selects that receive flow control state machine as the source for the $\overline{\text{RTS}}$ output. When the auto flow control mode is disabled, the $\overline{\text{RTS}}$ output is controlled by manually writing another bit in the modem control register. The receive flow control circuitry also consists of the receive flow control state machine 73. Receive flow control state machine 73 controls the operation of the $\overline{\text{RTS}}$ output when the auto flow control mode is enabled. When auto flow control mode is disabled, the $\overline{\text{RTS}}$ output multiplexer selects the RTSQ input so that the $\overline{\text{RTS}}$ output is controlled by the local processor, which sets the $\overline{\text{RTS}}$ output when it is ready to receive data by writing the appropriate bit in the modem control register. If the auto flow control feature is enabled, the receive flow control state machine samples the receive data FIFO status flags to determine if the receive data FIFO threshold has been reached. These are shown as inputs to the state machine 73 in FIG. 7. The user may set one of four threshold levels for the receive data FIFO, and the receive state machine operation will vary according to the threshold level selected, so these are inputs to the receive state machine in FIG. 7 as well.

The receive byte counter 70 is an up/down counter which indicates the current number of data words resident in the receiver data FIFO. The counter is incremented by the receive flow control state machine 73 each time a word is transmitted by the remote device into the serial-in/parallel-out register, and then moved into the receive data FIFO. The receive byte counter 70 is decremented each time a word is read out of the receive data FIFO by the processor coupled to the UART.

The compare threshold logic 74 is a comparator which compares the current byte counter 70 output to the receive data FIFO threshold as set by the user in an addressable control register. If the count is equal to or greater than the threshold, the output THRHLD is asserted to indicate that condition to the receive flow control state machine 73.

FIG. 8 depicts the modem control register 71 of FIG. 7. Bits 0 and 2–4 are related to functions having no bearing on the operation of the invention, and so are not discussed here. Bit 1 is the RTS control bit which operates exactly the same as for the UART's of the prior art, i.e., the receiver processor may set this bit to cause the $\overline{\text{RTS}}$ output to be asserted and thereby initiate the next transfer from the transmitting processor. Bit 5 is the auto flow enable bit. By writing this bit, the user places the UART into the auto flow control mode of the invention. Alternately, if this bit is left unasserted, the UART operates exactly as the UARTs of the prior art, for compatibility with old systems. If the auto flow enable bit is set, however, the $\overline{\text{RTS}}$ output is controlled by the receive state machine as shown in FIG. 7.

Figure 9:
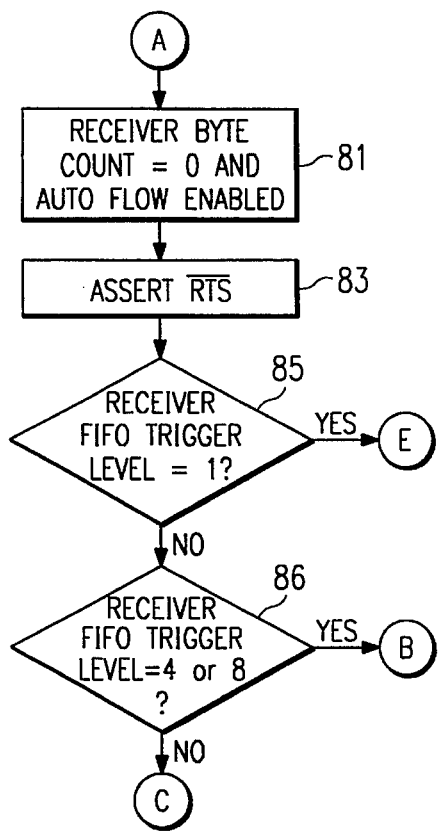

FIG. 9 depicts the first four states of the state flow diagram for the receive flow control state machine 73 of FIG. 7. During data transfers, the receive data FIFO counts the number of words stored by incrementing an up/down counter, the receive byte counter. The byte counter is decremented when a word is read out by the receiving processor, and incremented when a word is stored into the receive data FIFO. Initially, the receive data FIFO is empty so the count is zero, and the state machine tests whether auto flow control mode is enabled. This occurs in state 81, the "receiver byte count =0 and auto flow enabled" state of FIG. 9. In state 83, the receive flow control state machine then asserts the $\overline{\text{RTS}}$ output to initiate a data transfer by signaling to the transmitter UART that the receiver UART is ready for data. The receive flow control state machine now transitions to another group of states depending on the setting of the receive data FIFO trigger level threshold.

In FIG. 9, the receive flow control state machine diagram depicts the branches made depending on the threshold trigger level of the receive data FIFO at the time that the auto flow control feature is enabled. After asserting the $\overline{\text{RTS}}$ output in state 83, the state machine transitions to state 85, labeled "receiver FIFO trigger level=1?", where the state machine tests whether the user has selected and programmed the trigger level at one word. If the trigger level is equal to one word, the state machine branches to label E, which is depicted in FIG. 10, described below.

If the threshold level is not set at one, the receive flow control state machine transitions to state 86, where the receive data FIFO threshold level is tested to determine if it is set at four or eight. If it is set at either level four or eight, the state machine takes the branch labeled "yes" from state 86 to label B, which is depicted at FIG. 11, described below. If the level is not four or eight, it is then known to be set at level 14, in which case the state machine takes the branch labeled "no" and transitions to label C, which is depicted in FIG. 12, described below.

Figure 10:
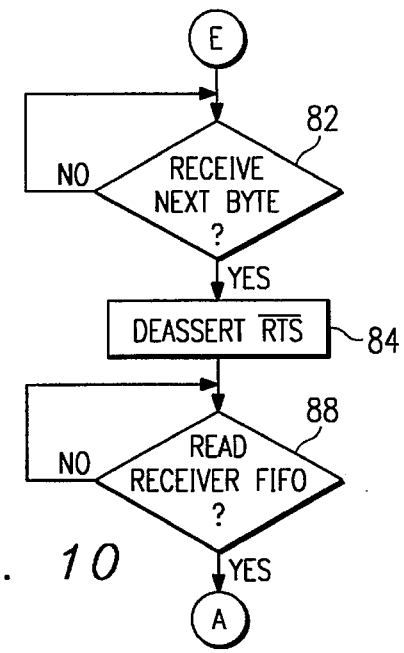

FIG. 10 depicts the state transitions required for the receive state machine when the trigger level is set at level one. Label E connects state 82 in FIG. 10 to state 85 on FIG. 9, and flows into state 82. In state 82, the receive flow control state machine waits for a single word to be written into the receive data FIFO. Note that the receive byte FIFO counter is not used when the trigger level is one word, instead the state machine immediately flows into state 84 and deasserts the $\overline{RTS}$ output, indicating the threshold has been reached. After the $\overline{RTS}$ output to the transmitting UART is deasserted, the state machine flows into state 88, where it loops awaiting a read command to the receive data FIFO. Once the receive data FIFO is read, the state machine returns to label A on FIG. 9 and begins the cycle again.

FIG. 11 depicts the state transitions required for the receive flow control state machine 45 when the receive data FIFO threshold level is set at either four or eight. Recall that if the threshold is four or eight, the state machine will transition from state 86, depicted in FIG. 9, to label B depicted at the top of FIG. 11. From label B the receive flow control state machine transitions into state 87, the "receive next byte?" state. If a byte is received, the state machine transitions to state 91, the "increment receiver byte counter"' state. After incrementing the counter 70 the state machine transitions to state 93. If no new byte has been received, the machine transitions to state 89. In state 89, the byte counter is tested to see if the count is zero, meaning that all of the received words in the receive data FIFO have been read. If the count is zero, the branch from state 89 labeled "yes" is taken, which causes the state machine to return to label A on FIG. 9 and start the cycle again. If the count is not equal to zero, the branch labeled "no" is taken from state 89 and the state machine transitions to state 93.

In state 93, the state machine tests the byte counter 70 of the receive FIFO against the threshold level. If the count is greater than or equal to the target threshold, the branch labeled "yes" is taken from state 93 and the machine transitions to state 95. In state 95, the $\overline{RTS}$ output is deasserted, indicating to the transmitting UART that the threshold has been reached and that therefore, no more words can be accepted. The state machine then transitions to state 97. If the threshold count has not been reached, the state machine transitions directly from state 93 to state 97, and the $\overline{RTS}$ output remains asserted.

In state 97, the receiver flow control state machine 73 tests whether a "read receiver FIFO" is present. If the receive data FIFO is being read, the state machine transitions to state 99. If there is no read present, the state machine transitions to state 102 and tests the status of the $\overline{RTS}$ output. In state 102, if the $\overline{RTS}$ output is deasserted, then the state machine transitions back to state 97 and again checks for a read byte to occur. This occurs when the threshold has already been met once for the current cycle, but some words remain in the receive data FIFO to be read by the local processor. If the $\overline{RTS}$ output is not deasserted, the state machine transitions back to state 87 to await the next byte of data from the transmitting UART. This occurs when some words have been written but the threshold has not yet been reached. In other words, once the threshold has been reached, $\overline{RTS}$ is deasserted and the state machine transitions back to state 97 to wait for the next read. At this time, the receiver will not accept any more words.

If there is a read present, the state machine transitions to state 99, where the receive data FIFO byte counter 70 is caused to be decremented. Once the byte count is decremented to reflect that the receive data FIFO has been read, the state machine transitions to state 101, where the byte count is again tested to see if it has reached zero. If the receive data FIFO byte count is zero, the receive data FIFO is empty and the state machine transitions back to label A in FIG. 9. If there is still data present in the receive data FIFO, the count will not equal zero and the state machine transitions back to state 102 to check the condition of the $\overline{RTS}$ output, as above. The receive state machine 73 will stay in this read byte loop until the byte counter 70 is equal to zero.

Note that when the receive data FIFO threshold is four or eight, the receive state machine keeps the $\overline{RTS}$ output asserted until the threshold is reached. The $\overline{RTS}$ output is then deasserted, and the signal remains deasserted until the entire receive data FIFO is emptied and the state machine transitions back to the initial state, label A in FIG. 9. The receiving processor must read the entire block of words before the receiver UART will again assert the $\overline{RTS}$ output, indicating it is ready to receive more data words.

FIG. 12 depicts the state transitions for the receiver flow control state machine 73 when the receive data FIFO is set for a threshold of 14. This threshold level is intended to be the most efficient when the auto flow control feature is used. The state machine enters the states depicted on FIG. 12 from FIG. 9, when it is determined that the threshold is set at 14. In state 103, the state machine tests whether the receiver UART is receiving a new byte and whether the byte count is less than or equal to 14. If both conditions are met, i.e., a new byte is being received and the byte count is less than the threshold, the receiver state machine transitions to state 105. If one of the conditions is not met, the state machine transitions to state 107.

In state 105 the receiver state machine causes the FIFO byte counter to be incremented, to record the receipt of the next byte. The state machine transitions to state 107.

In state 107, the machine again tests whether the byte count is equal to zero. If the counter has been decremented to zero the transaction is complete and the machine transitions to the initial state, label A on FIG. 9. If not, the state machine transitions on to state 109.

In state 109, the state machine tests for two simultaneously occurring conditions: whether the current byte count is 15 and whether the machine is currently receiving another byte (which would be the sixteenth word.) If both conditions are met, the receive data FIFO will be completely full when the current word is shifted in, assuming that the receive data FIFO is 16 bytes deep. If these conditions are not met, the state machine 73 transitions to label D on FIG. 13. If the two conditions are met, the state machine transitions to state 111.

In state 111, the receiver flow control state machine responds to the fact the receive data FIFO is about to fill by deasserting the $\overline{RTS}$ output, indicating to the transmitting UART device that no more data can be accepted. The state machine then transitions to state 113, where it waits for the currently received byte to complete. After the current byte is completely received, the state machine transitions to state 115, where the received data FIFO byte counter 70 is incremented, and should now equal 16 for this example. The receiving UART state machine then transitions to label D on FIG. 13.

Figure 13:
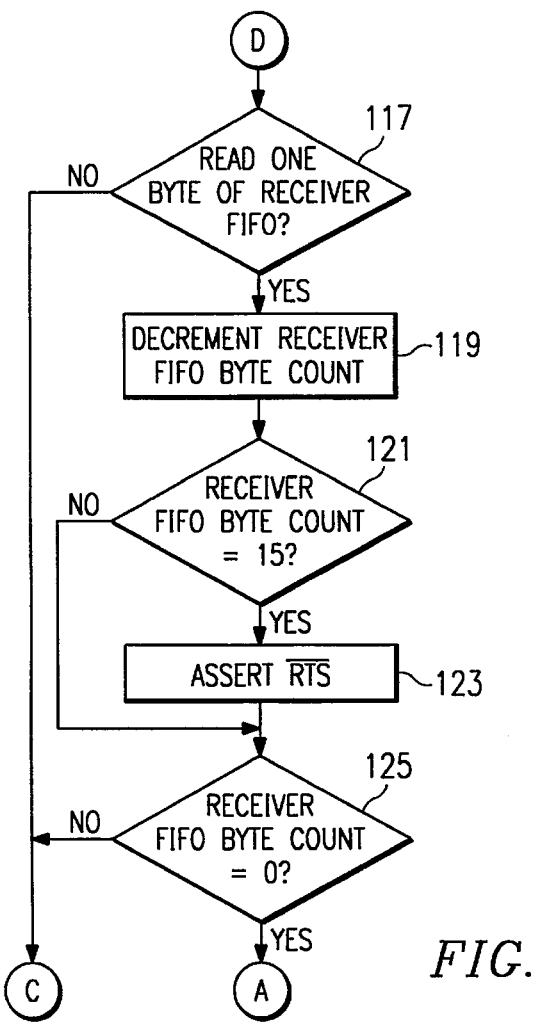

FIG. 13 depicts the read receive data FIFO states for the receive flow control state machine 73 when the threshold for the receive data FIFO is set at 14. In state 117 the state machine tests whether a read command is waiting for the receive data FIFO. If so, the state machine transitions to state 119, where the receive data FIFO byte count is decremented. If not, the state machine returns to label C on FIG. 12 to test for another data byte coming in to the FIFO.

Assuming a read receive data FIFO command is present, the state machine transitions from state 117 to state 119, where the receive data FIFO byte counter 70 is decremented. After the counter 70 is decremented, the receive data FIFO byte count is tested in state 121. If the count is 15, there is room for at least one word in the receive data FIFO, and the state machine takes the "yes" branch to the assert $\overline{RTS}$ state, state 123. If not, the receive data FIFO is either full and the $\overline{RTS}$ output has been deasserted in state 111 described above, or it is not full and the $\overline{RTS}$ output is still asserted, so that no action is required with respect to the $\overline{RTS}$ output. In either case the state machine then transitions to state 125 where the receive data FIFO byte counter 70 is again tested for zero. If the count is zero, the receive data FIFO has been completely read and is now empty, and the machine transitions back to label A on FIG. 9. If the receive data FIFO is not empty, the machine transitions to label C on FIG. 12, where the cycle begins again.

Note that when the receive data FIFO threshold level is set to 14, the operation of the receiving UART differs from its operation when the threshold is set at one, four or eight. In the case where the threshold is 14, the entire receive data FIFO will be used as efficiently as possible. As soon as the receive data FIFO is full, the $\overline{RTS}$ output to the transmitting UART is deasserted to stop incoming data. As soon as a single word is read out of the receive data FIFO, the state machine transitions to states 121 and 123 and $\overline{RTS}$ is again asserted, so that a single word may be received. This operation is intended to take full advantage of the auto flow control feature. In contrast, the operation of the receive data FIFO state machine when the threshold is 1, 4 or 8 differs in that once the $\overline{RTS}$ output is deasserted, the state machine will not again assert the $\overline{RTS}$ output until the entire receive data FIFO is read and the byte counter 70 returns to zero. This mode is compatible with a transmitting device which does not have auto flow control, but makes less efficient use of the auto flow control feature of the receiving device and of the receive data FIFO circuitry.

Figure 14:
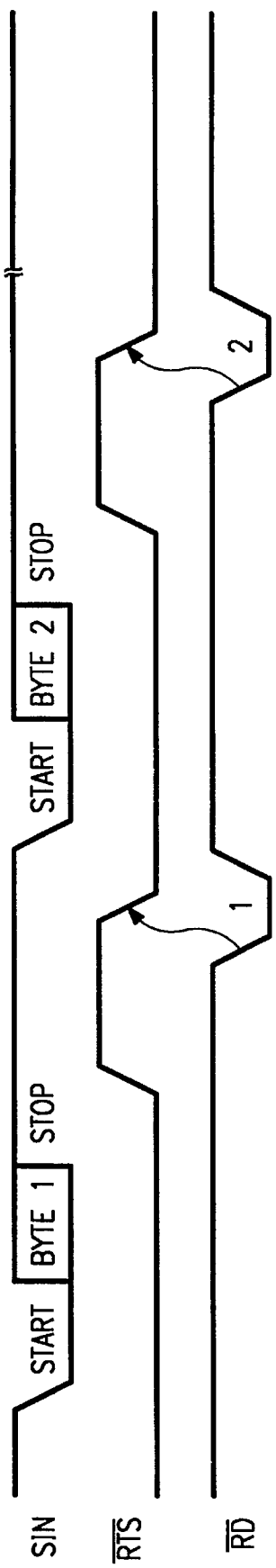
FIG. 14 depicts a waveform timing diagram of the operation of the receive flow control circuitry of the invention when the receive data FIFO threshold is one byte.

FIG. 14 depicts the operation of the receive flow control state machine 73 of FIGS. 9–10, when the receive data FIFO threshold is set at a trigger level of one word. Signal SIN represents the serial input signal to the receiver circuitry. Signal $\overline{RTS}$ in the figure represents the request to send output from the receiver UART. Signal $\overline{RD}$ represents the read input from the receiving processor to the receive data FIFO.

In operation, the receiver circuitry first receives the first data word, labeled byte 1, in a serial shifting operation. Since the threshold is set to one word, the receive state machine now causes the $\overline{RTS}$ output to be deasserted. It will remain deasserted until the receiving processor reads the first byte from the receive data FIFO. When the read input signal is asserted at event 1 in FIG. 14, the receive state machine immediately reasserts the $\overline{RTS}$ output to indicate that it is ready for the next data word from the transmitting device. In FIG. 14, the cycle is repeated for the next data word, labeled byte 2, in exactly the same manner. When the $\overline{RD}$ input is again asserted, at event 2 in FIG. 14, the $\overline{RTS}$ output is again asserted in response.

Figure 15:
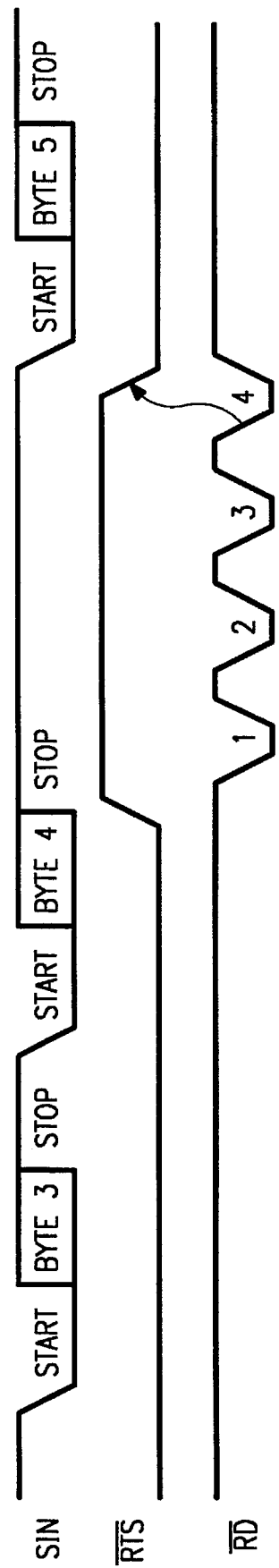
FIG. 15 depicts a waveform timing diagram of the operation of the receive flow control circuitry of the invention when the receive data FIFO threshold is four bytes.

FIG. 15 depicts the operation of the receive flow control state machine for a transaction where the threshold level of the receive data FIFO is set at level four. Signal SIN is again the serial data input signal to the receiver circuitry of the receiving UART. Signal $\overline{RTS}$ again depicts the request to send output of the receiving UART. Signal $\overline{RD}$ is again depicts the read input signal from the receiving processor to the receive data FIFO of the receiving UART.

As shown in FIG. 15, when the stop bit of the fourth word is received, the receive state machine 73 causes the $\overline{RTS}$ output to be deasserted, thereby pausing the transfers from the transmitting UART. Next the $\overline{RD}$ input is toggled up and down four times, once for each byte stored in the receive data FIFO, to cause the four words to be popped out of the receive data FIFO and transmitted to the receiving processor. At the beginning of the fourth read command, labeled event 4, the receive state machine detects that the last word is being transferred from the receive data FIFO and again asserts the RTS_ output in response to indicate to the transmitting device that the receive data FIFO circuitry is ready for more data words.

Figure 16:
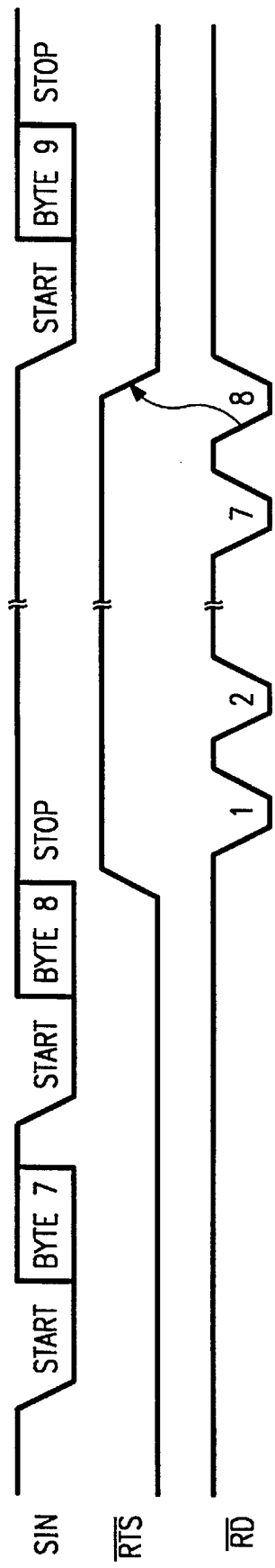
FIG. 16 depicts a waveform timing diagram of the operation of the receive flow control circuitry of the invention when the receive data FIFO threshold is eight bytes.

FIG. 16 depicts the same situation as FIG. 15, except that the threshold level for the receive data FIFO circuitry is now set at eight bytes instead of four. Again, in operation the $\overline{RTS}$ output is deasserted as the stop bit of the eighth word is received. The $\overline{RTS}$ output is reasserted when the $\overline{RD}$ input is toggled for the eighth time.

Figure 17:
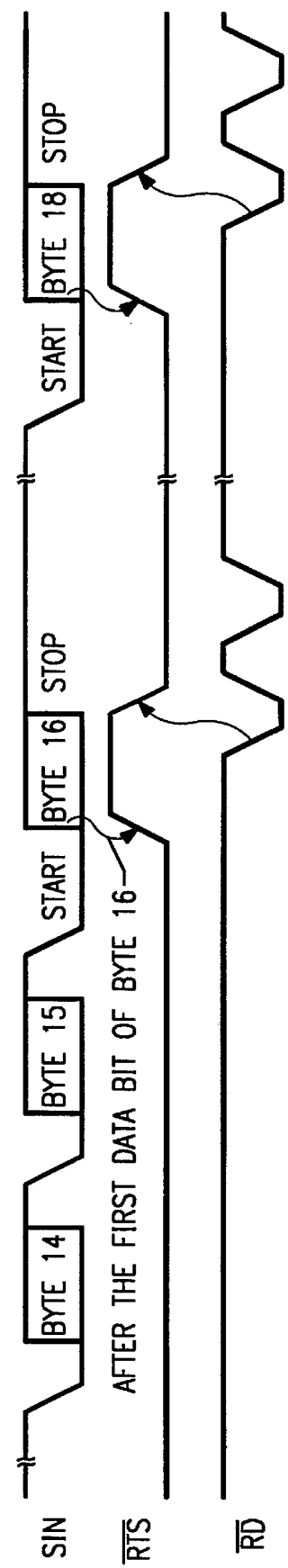
FIG. 17 depicts a waveform timing diagram of the operation of the receive flow control circuitry of the invention when the receive data FIFO threshold is 14 bytes.

FIG. 17 depicts the operation of the $\overline{RTS}$ output and the receiver state machine circuitry when the receive data FIFO byte threshold is set at level 14. Again, the SIN signal depicts the serial input to the receiver UART. The $\overline{RTS}$ signal depicts the request to send output from the receiving UART, and the $\overline{RD}$ signal depicts the read input from the local processor.

In FIG. 17, first a block of 15 words is sent and received on signal SIN. At the beginning of the serial data for the 16th byte, the receive state machine deasserts the RTS_ output. As soon as a single word is read out of the receive data FIFO, as indicated by the first down and up transitions of the $\overline{RD}$ input, the $\overline{RTS}$ output is again asserted, indicating that there is room for more data. In FIG. 17, two words are read out. Then byte 17 is received (not shown), and when the first data bit of byte 18 is received the $\overline{RTS}$ output is deasserted. Once the $\overline{RD}$ input toggles down and up again, indicating that room for a single word is available, the state machine again asserts the $\overline{RTS}$ output. When operating with a threshold level of 14, the receive flow control state machine circuitry will continue to deassert the $\overline{RTS}$ output each time the receive data FIFO has 15 words in it and a 16th word is received, and the receiver state machine will reassert the RTS_ output when a read occurs, so that there are 15 or fewer words in the receive data FIFO.

The auto flow control circuitry of the invention can be used with smaller or deeper receive data FIFO's, the use of the particular threshold levels described herein being merely illustrative. Also, the receiver and transmitter auto flow control circuitry can operate independently, so that a UART incorporating the invention may be operated with auto flow control enabled for transmission but operating in the conventional mode for receiving data, or vice versa. This requires only one additional enable bit in the control register, so that the receive and transmit flow control circuitry are separately enabled by the user.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. In an asynchronous communication device, comprising an input data bus; and a Universal Asynchronous Receive/Transmit (UART) circuit including a transmit data memory coupled to said input data bus for receiving and storing data words for transmission; the improvement comprising:

said UART further including transmit data control circuitry for transmitting the data words on an asynchronous transmit data output, said transmit data control circuitry pausing said transmission of said data words, without processor intervention, in response to a transition on a first control signal coupled to a remote receiving device.

2. The improvement of claim 1, further comprising said UART further including:

a receive data input for receiving data transmitted asynchronously from a remote transmitting device;

a receive data memory coupled to said receive data input for storing data words received from said transmitting device; and receive data control circuitry for outputting a second control signal to said remote transmitting device, without processor intervention, said receive data control circuitry asserting said second control signal when the receive data memory is ready to receive data and deasserting said second control signal when the number of words stored in said receive data memory exceeds a predetermined threshold.

3. The improvement of claim 2, wherein said transmit data control circuitry farther comprises:

a transmit data state machine for causing said transmit data memory to output individual stored data words and to transmit said data words on said asynchronous transmit data output signal, and further for pausing said data transmission, without processor intervention, responsive to a first transition on said first control signal and to restart said data transmission, without processor intervention, responsive to a second transition on said first control signal.

4. The improvement of claim 3, wherein said transmit data control circuitry further comprises:

a parallel- input/serial-output register coupled to said transmit data memory and to said asynchronous transmit data output, for receiving each of said stored data words from said transmit data memory and for serially outputting each of said data words onto said asynchronous transmit data output responsive to control signals from said transmit data state machine.

5. The improvement of claim 4, wherein said transmit data state machine comprises a synchronous logic state machine.

6. The of claim 4, wherein said parallel- input/serial-output register comprises a D flip-flop register coupled to form a shift register having a parallel data load input.

7. The improvement of claim 2, wherein said receive data control circuitry further comprises:

a receive data state machine coupled to said receive data memory and to said second control signal, said state machine for loading data received at said receive data input into said receive data memory, said receive data state machine continuing to load said receive data memory with received data words until the number of words stored in said receive data memory exceeds a predetermined threshold, said receive data state machine deasserting said second control signal, without processor intervention, when said predetermined threshold is reached.

8. The improvement of claim 7, wherein said receive data memory further comprises:

a parallel data port coupled for outputting said received data from said receive data memory, said receive data state machine causing said receive data memory to transmit said received data words responsive to a command input.

9. The improvement of claim 7, wherein said receive data control circuitry further comprises:

an up/down counter having an increment and decrement input signal, said up/down counter coupled to said receive data state machine and having an output that indicates the current number of words stored in said receive data memory.

10. The improvement of claim 9, wherein said receive data control circuitry further comprises a comparator coupled to said up/down counter and to a predetermined threshold, for comparing the number of words in the receive data memory to the predetermined threshold and having an output indicating when the threshold is reached.

11. The improvement of claim 10, wherein said predetermined threshold may be selected from a plurality of user defined threshold values.

12. In a method for implementing an asynchronous communication device, comprising the steps of providing a data input; and providing a Universal Asynchronous Receive/Transmit (UART) circuit including a transmit data memory coupled to said data input for receiving and storing data words for transmission; the improvement comprising:

providing said UART with transmit data control circuitry for retrieving each data word from said transmit data memory and for transmitting the data words on an asynchronous transmit data output, said transmit data control circuitry pausing said transmission of said data words, without processor control, in response to a first control signal coupled to a remote receiving device.

13. The improvement of claim 12, further comprising the steps of:

providing said UART with a receive data input for receiving data transmitted asynchronously from a remote transmitting device;

providing said UART with a receive data memory coupled to said receive data input for storing data words received from said remote transmitting device; and providing said UART with receive data control circuitry for outputting a second control signal to said remote transmitting device, without processor intervention, said receive data control circuitry asserting said second control signal when the receive data memory is ready to receive data and deasserting said second control signal when the number of words stored in said receive data memory exceeds a predetermined threshold.

14. The improvement of claim 13, wherein said step of providing transmit data control circuitry further comprises:

providing a transmit data state machine for causing said transmit data memory to output individual stored data words and to transmit said data words on said asynchronous transmit data output signal, and further for pausing said data transmission, without processor intervention, responsive to a first transition on said first control signal and to restart said data transmission, without processor intervention, responsive to a second transition on said first control signal.

15. The improvement of claim 13, wherein said step of providing transmit data control circuitry further comprises:

providing a parallel-input/serial-output register coupled to said transmit data memory and to said asynchronous transmit data output, for receiving each of said stored data words from said transmit data memory and for serially outputting each of said data words onto said asynchronous transmit data output responsive to control signals from said transmit data state machine.

16. The improvement of claim 14, wherein said step of providing a transmit data state machine comprises providing a synchronous logic state machine.

17. The improvement of claim 15, wherein said step of providing a parallel-input/serial-output register comprises providing a D flip-flop register coupled to form a shift register having a parallel data load input.

18. The improvement of claim 13, wherein said step of providing receive data control circuitry further comprises the step of:

provid ing a receive data state machine coupled to said receive data memory and to said second control signal, said receive data state machine for loading data received at said receive data input into said receive data memory, said receive data state machine continuing to load said receive data memory with received data words until the number of words stored in said receive data memory reaches a predetermined threshold, said receive data state machine asserting said second control signal, without processor intervention, when said predetermined threshold is reached.

19. The improvement of claim 18, and further comprising the steps of:

providing a parallel data port coupled for outputting said received data from said receive data memory, said receive data state machine causing said receive data memory to transmit said received data words responsive to a command input.

20. The improvement of claim 18 wherein said step of providing said receive data control circuitry further comprises the step of:

providing an up/down counter having an increment and decrement input signal, said up/down counter coupled to said receive data state machine and having an output that indicates the current number of words stored in said receive data memory.

21. The improvement of claim 20, wherein said step of providing receive data control circuitry further comprises the step of providing a comparator coupled to said up/down counter and to a predetermined threshold, for comparing the number of words in the receive data memory to the predetermined threshold and having an output indicating when the threshold is reached.

22. The improvement of claim 21, wherein said step of providing receive data control circuitry further comprises providing a predetermined threshold which may be selected from a plurality of user defined threshold values.

23. In a method for transferring data between local and remote data processor circuits, using an asynchronous data transfer system;

said data transfer system comprising:

local and remote UARTs, a local interface bus for communicating data under local processor control in parallel format between said local processor circuit and said local UART, a remote interface bus for communicating data under remote processor control in parallel format between said remote processor circuit and said remote UART, and an asynchronous serial communication carrier link coupling said local and remote UARTs; each UART including:

a transmit data FIFO coupled to receive and hold output data in parallel format from said respective interface bus;

a receive data FIFO coupled to receive and hold input data in parallel format for said respective interface bus;

a parallel-in/serial-out register coupled to receive said output data in parallel format from said transmit data FIFO and transmit the same in serial format to said carrier asynchronous serial communications link;

a serial-in/parallel-out register coupled to receive said input data in serial format from said carrier asynchronous serial communications carrier link and deliver the same in parallel format to said receive data FIFO, said input data for one of said UARTs being said output data from said other UART;

a carrier control register coupled to transmit to said carrier link an RTS control output signal to indicate that said one UART is ready to receive a next multiple bit block of said input data; and a carrier status register coupled to receive from said carrier link a CTS control input signal that indicates that said other UART is ready to receive said next block of input data, said CTS control input signal for said one UART being said RTS control output signal from said other UART;

and said method comprising:

said local processor checking said local UART status register to confirm the presence of said CTS signal;

responsive to said CTS signal presence confirmation, said local processor writing blocks of output data in parallel format from said local interface bus to said local UART transmit data FIFO;

said local UART transmit data FIFO transferring said output data blocks in parallel format to said local UART parallel-in/serial-out register;

shifting said output data blocks in serial format from said local UART parallel-in/serial-out register to said carrier link;

shifting said output data blocks, as input data blocks, in serial format from said carrier link into said remote UART serial-in/parallel-out register;

transferring said input data blocks in parallel format from said remote UART serial-in/parallel-out register to said remote UART receive data FIFO;

if said remote UART receive data FIFO is filled, asserting an interrupt signal to said remote UART processor; said data transmission continuing until said remote UART processor responds to said interrupt of until said local UART transmit data FIFO is empty, even though later received input data may overwrite earlier received input data in said remote UART receive data FIFO; and if said data transmission continues after said remote UART receive data FIFO has filled, setting an overrun error bit in said status register;

the improvement wherein said method further comprises:

providing each UART with a transmit flow control circuit coupled to said CTS input, for control of transfer of data from said transmit data FIFO to said parallel-in/serial-out register and output to said carrier link;

checking said local UART status register with said local UART transmit flow control circuit to confirm said CTS signal presence before beginning transfer of a block of data from said local UART transmit data FIFO to said local UART parallel-in/serial-out register;

responsive to said CTS signal presence confirmation by said local UART transmit flow control circuit, transmitting said data block from said local UART transmit data FIFO to said local UART parallel-in/serial-out register, to said carrier link, to said remote UART serial-in/parallel-out register and into said remote UART receive data register;

at end of said data block transmission, checking said local UART transmit data FIFO with said local UART transmit flow control circuit to determine if more blocks are ready to transmit;

if more words are ready to transmit, checking said local UART status register with said local UART transmit flow control circuit to confirm said CTS signal presence before beginning transfer of a next block of data;

responsive to said CTS signal presence confirmation by said local UART transmit flow control circuit, transmitting said next data block; and if said CTS signal presence is not confirmed by said local UART transmit flow control circuit, pausing said transfer of said next data block, until said CTS signal presence is confirmed.

\* \* \* \* \*